US007376936B2

(12) United States Patent
Bulusu

(10) Patent No.: US 7,376,936 B2
(45) Date of Patent: May 20, 2008

(54) METHOD OF IMPLEMENTING FIXED-WIDTH DATA TYPES

(75) Inventor: Gopi Kumar Bulusu, Visakhapatnam (IN)

(73) Assignee: Sankhya Technologies Private Limited, Andhra Pradesh (IN)

( * ) Notice: Subject to any disclaimer, the term of this patent is extended or adjusted under 35 U.S.C. 154(b) by 770 days.

(21) Appl. No.: 10/501,008

(22) PCT Filed: Mar. 8, 2002

(86) PCT No.: PCT/IN02/00037

§ 371 (c)(1),
(2), (4) Date: Jul. 8, 2004

(87) PCT Pub. No.: WO03/077122

PCT Pub. Date: Sep. 18, 2003

(65) Prior Publication Data

US 2005/0132328 A1     Jun. 16, 2005

(51) Int. Cl.
*G06F 9/45*    (2006.01)
(52) U.S. Cl. ..................................... 717/114
(58) Field of Classification Search ................. 717/114
See application file for complete search history.

(56) References Cited

U.S. PATENT DOCUMENTS 5,828,884 A    10/1998    Lee
6,044,216 A    3/2000    Bhargava
6,049,667 A    4/2000    Bates
6,055,370 A    4/2000    Brown
6,247,174 B1    6/2001    Santhanam
6,381,736 B1    4/2002    Koltz
6,388,586 B1    5/2002    Fischer
2003/0167458 A1*    9/2003    Santhanam et al. ......... 717/114

OTHER PUBLICATIONS

Radetzki et. al., Data Type Analysis for Hardware Synthesis from Object-Oriented Models, Jan. 1999, ACM, p. 1-6.*
International Search Report Dated Sep. 12, 2002.

* cited by examiner

*Primary Examiner*—John Chavis
(74) *Attorney, Agent, or Firm*—Rader, Fishman & Grauer, PLLC

(57) ABSTRACT

A method of implementing fixed-width data types which are not directly supported by a programming language, in a portable manner. A set U of required fixed-width data types, an ordered set B of basic data types and a set V with all possible data type widths are provided as inputs (201). A generic data type G having an integer parameter and a data type parameter is created (202). For every data type width $WV_j$ from set V and basic data type $B_i$ from set B a specialized data type G is created (203). Then, each required data type $U_k$ from set U of required data types is implemented by creating and mapping required data type $U_k$ to the implementation of $U_k$ provided by the generic data type $G_{11}$ having the parameters data type width $WB_1$ and basic data type $B_1$ (204).

2 Claims, 3 Drawing Sheets

Figure I

METHOD OF IMPLEMENTING FIXED-WIDTH DATA TYPES

FIELD OF THE INVENTION

The invention relates to a method of implementing, in a portable manner, fixed width data types which are not directly supported by a programming language.

BACKGROUND OF THE INVENTION

Different programming languages directly support different basic data types. Many programming languages allow additional user defined data types created out of basic data types. For example, arrays, structures and records.

Data objects or variables have to be represented using a finite state machine such as computer memory, which is a sequence of binary digits. Therefore integer data types supported by programming languages often have a finite range. Programming languages often define the range of a particular data type as the number of binary digits or bits that should be used to represent a value belonging to that data type. This range of a data type is represented as data type width. For example data type "short" in the Java programming language is defined to have a data type width of 16 bits giving a range of values −65536, −65535 . . . 0 . . . +65535.

Some programming languages do not define the data type width for basic data types, and chose to leave the decision of defining these to compiler implementors. This means that different compilers may consider different data type width for the same data type. For example, in programming languages C and C++ valid data widths for the 'int' includes 16-bits, 32-bits or 64-bits. Such data types therefore may have different widths depending on the compiler used.

Complex programs developed using high level programming languages are often organized into smaller units as given below.

a) Functions or procedures with a defined set of formal parameters such as a list of data types. When invoked with a set of actual arguments that is a list of matching data values or objects, these functions perform some set of operations on those values and/or objects possibly invoking other functions to complete the operations.

b) User defined data types that define more complex data types using other existing basic or user defined data types.

Often, the same operation such as swap or sorting may be defined for different data types. Without generic programming, the programmer is forced to develop different functions for implementing the same operation for formal parameters with different data types. For example a sort function for an array of integers and another for an array of floating point numbers.

Similarly, a complex data type such as a linked list or complex number can be defined using different basic data types. For example, one user defined data type that can be used for integer real and imaginary parts and another for floating point real and imaginary parts. Generic programming allows the development of functions and complex data types that can be used with more than one set of formal parameter types or constant data values. For example a single sort function for an array of integers, an array of floating point numbers or an array of any data type that defines an ordering relationship such as "less than" between any two values in the domain of the data type. Different languages and compilers may implement generic programming in different ways. The two common ways are static resolution of type parameters and dynamic resolution of type parameters. A generic function or type provides an implementation of the function or type, which can be used with different sets of the type parameters. However, a programmer may sometime choose to over-ride the implementation of the generic function or type, for a specific set of type parameters. This is referred to as specialization, and such types or functions are referred to as specialized type for function.

An example in C++ is given below:

```
// Generic function swap.
Template<class C>void swap (C & c1, C&c2) {
        C tmp;
            tmp = c1;
            c1 = c2;
            c2 = tmp;
    }
    // specialized function swap for swapping 2 strings.
        // will only work when length of strings is equal.
        // swaps string , instead of swapping pointers to strings.
        template <> void swap (char * C1, char * c2)
    {
        char tmp;
        While (*c1 && *c2)    {
                tmp = *c1;
                *c1 = *c2;
            *c2 = tmp;
        } /* while */
    }
```

OBJECT OF THE INVENTION

Most programs are written to solve real world computational problems. Often, these programs have to represent data values from real world such as dates, age, scientific values etc. using programming languages. Often programs use objects of a particular data type to represent data values, to ensure representation of all possible values that can be assigned to the object in real world using the data type. This requires that programs use fixed-width data types and not variable-width data types. However, where the programming language does not provide fixed-width data types the program developer is required to define a user defined fixed-width data type that uses one or more 'appropriate' basic data type of the required width depending on the compiler used.

A program may use the following solutions to solve the problem of implementing fixed-width data types. Use a pre-processor to map macro names used as fixed-width data types to appropriate basic data type, depending on compiler and central processor unit.

Simple Example in C++:
ifdef COMPILER_IS_VISUAL_C
define int32 int
elif COMPILER_IS_MSC
define int32 long
endif
int32 var1, var2 /* int32 will be int with VISUAL C++ */
    /* int32 will be long with MSC */
. . .

The disadvantage of this method is that this process has to be repeated for each data type and compiler implementation and the program may need modifications for porting to a new compiler.

In general preprocessor macros are not visible to the compiler and other program development and troubleshooting tools such as debuggers and therefore, the program is more difficult to maintain. This method cannot be used if there is no basic data type with data type width matching that of the required fixed-width data type.

Another method is to use a pre-processor, and use an appropriate language mechanism to create a fixed-width data type to appropriate basic data type, depending on compiler and the central processor unit.

Simple Example in C++:

```
#ifdef COMPLIER_IS_VISUAL_C
typedef int int32;
#elif COMPILER_IS_MSC
typedef long int32;
#endif
``` int32 var1, var2 /* int32 will be int with VISUAL C++ */
/* int32 will be long with MSC */

The disadvantage in this method is also that this process is repeated for each data type and compiler implementation. The program may need modifications for porting to a new compiler. This method also cannot be used if there is no basic data type with data type width matching that of the required fixed-width data type.

Still another method is to define for each fixed-width data type a new user-defined data type. This new type uses an array or structure of basic data types, along with programmer supplied functions that implement the necessary operations defined for the data type.

Example in C++:

```
Struct int16     {
    // comment " use array of 2 int8's to
represent one int16
    int8 v {2};
    // additional structure members to
define operations.
            friend int16 operator + (int16, int16);
            friend int 16 operator − (int16, int
16);
};
    struct int 32 {
        // comment: use array of 2 int16's to
represent one int32
            int16 v [2];
            // additional structure members to
define operations.
                friend int32 operator +{int32,
int32);
                friend int 32 operator − (int32,
int32);
            };
```

The disadvantage is that user defined data types are often less efficient than basic data types. One may have to depend on any one of the earlier described methods to decide on an appropriate basic data type to be used as the array element type or structure member type.

The object of the invention is to provide a unique method of implementing fixed-width data types, which are not directly supported by a programming language, in a portable manner.

SUMMARY OF THE INVENTION

The method according to the invention is described below in the following steps.

A set U of required fixed-width data types that have to be implemented in which each fixed-width data type $U_k$ from the set U has a fixed data type width of $WU_k$ is provided as input along with an ordered set B of basic data types that are directly supported by the said programming language, in which each basic data type $B_i$ from the set B has a data type width $WB_i$ and each data type width $WB_{i+1}$ is greater than or equal to data type width $WB_i$, and a set V having all possible data type widths $WV_j$ for every basic data type $B_i$ from the set B of basic data types.

A generic data type G with two formal parameters consisting of an integer parameter and a data type parameter is created.

For every combination of data type width $WV_j$ from the set V, and basic data type $B_i$ from the set B, a specialized generic data type G having an integer parameter WVj and a data type parameter $B_i$ is created and a possible implementation within the specialized generic data types G is provided for each required fixed-width data type $U_k$ from the set U by comparing the data type width $WV_j$ with data type width $WU_k$ for every required fixed-width data types $U_k$ from the set U.

If data type width $WV_j$ is equal to the data type width $WU_k$, the required fixed-width data type $U_k$ is implemented by creating and mapping data type $U_k$ to data type $B_i$. If data type width $WV_j$ is greater than the data type width $WU_k$, the required fixed-width data type $U_k$ is implemented by using a sub-range of basic data type $B_i$. If data type width $WV_j$ is lesser than the data type width $WU_k$, and if $B_i$ is not the last basic data type form the set B, the required fixed-width data type $U_k$ is implemented by mapping $U_k$ to the implementation of $U_k$ provided by the specialized generic data type G having the integer parameter $WB_{i+1}$ and the data type parameter $B_{i+1}$. If data type width $WV_j$ is lesser than the data type width $WU_k$ and if $B_i$ is the last basic data type from set B, the required fixed-width data type $U_k$ is implemented by using an array, with the least required number of elements of basic data type $B_i$ or a record, with least required number of fields of basic data type $B_i$.

Finally the set U of required fixed-width data types $U_k$ is implemented by selecting from the above possible implementations, a correct implementation for each required fixed-width data type $U_k$ of the set U of required fixed-width data types, by creating and mapping the required fixed-width data type $U_k$ to the implementation of $U_k$ provided by the specialized generic data type G having the integer parameter $WB_1$ and the data type parameter $B_1$.

An alternate method within the scope of the invention for achieving the same objective comprises the following steps.

A set U of required fixed-width data types that have to be implemented in which each fixed-width data type $U_k$ from the set U has a fixed data type width of $WU_k$ is provided as input along with an ordered set B of basic data types that are directly supported by the said programming language, in which each basic data type $B_i$ from the set B has a data type width $WB_i$ and each data type width $WB_{i+1}$ is greater than or equal to data type width $WB_i$, and a set V having all possible data type widths $WV_j$ for every basic data type $B_i$ from the set B of basic data types.

A generic data type G with two formal parameters namely an integer parameter and a data type parameter is created.

For every combination of data type width $WV_j$ from the set V, and basic data type $B_i$ from the set B a specialized generic data type $G_{ji}$ having an integer parameter WVj and a data type parameter $B_i$ is created and a possible implementation within the specialized generic data types $G_{ji}$ is provided for each required fixed-width data type $U_k$ from the set U by comparing the data type width $WV_j$ with data type width $WU_k$ for every required fixed-width data types $U_k$ from the set U.

If data type width $WV_j$ is equal to the data type width $WU_k$, the required fixed-width data type $U_k$ is implemented by creating and mapping data type $U_k$ to data type $B_i$. If data type width $WV_j$ is greater than the data type width $WU_k$, and if $B_i$ is not the first basic data type from the set B, the required fixed-width data type $U_k$ is implemented by creating and mapping the required fixed-width data type $U_k$ to the implementation of $U_k$ provided by the specialized generic data type G having the integer parameter $WB_{i-1}$ and the data type parameter $B_{i-1}$. If data type width $WV_j$ is greater than the data type width $WU_k$, and if $B_i$ is the first basic data type form the set B, the required fixed-width data type $U_k$ is implemented by using a sub-range of basic data type $B_i$. If data type width $WV_j$ is lesser than the data type width $WU_k$, the required fixed-width data type $U_k$ is implemented by using an array, with the least required number of elements of basic data type $B_i$ or a record, with least required number of fields of basic data type $B_i$.

Finally the set U of required fixed-width data types $U_k$ is implemented by selecting from the above possible implementations, a correct implementation for each required fixed-width data type $U_k$ from the set U of required fixed-width data types, by creating and mapping the required fixed-width data type $U_k$ to the implementation of $U_k$ provided by the specialized generic data type G having an integer parameter $WB_n$ and a data type parameter $B_n$, where $B_n$ is the last basic data type from the set B of basic data types. Throughout he above description, i, j, k' and n are all positive integers.

DESCRIPTION WITH REFERENCE TO THE ACCOMPANYING DRAWINGS

Figure 1:
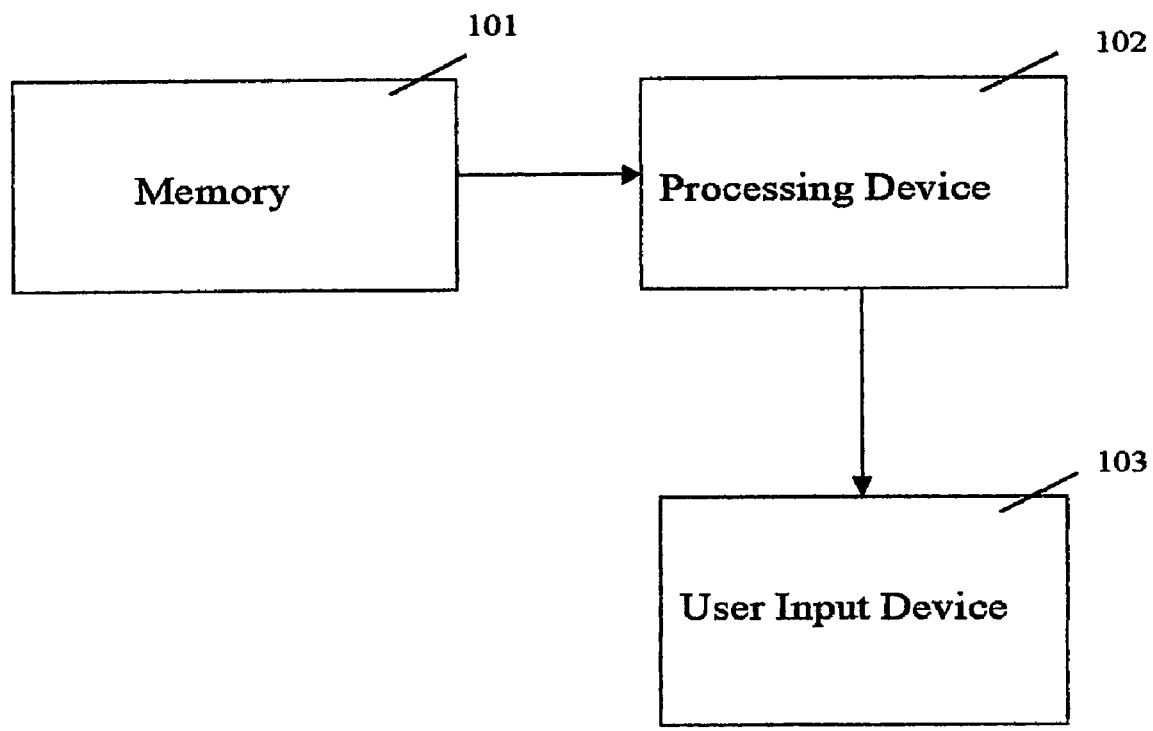
FIG. 1 is a schematic diagram of system with which the invention can be implemented.

The system shown in FIG. 1 may be used for implementing the invention. It comprises a memory (101), processing device (102) and a user interface device (103). The memory (101) typically consists of RAM and ROM. The processing device (102) may be a microprocessor. The user interface may be key board, a mouse and a display. To implement a program, the program must be compiled using the processing device (102). As described herein, the processing device (102) implements fixed-width data types which are directly supported by a programming language in a portable manner satisfying the hardware constraints by the method according to the invention.

Figure 2:
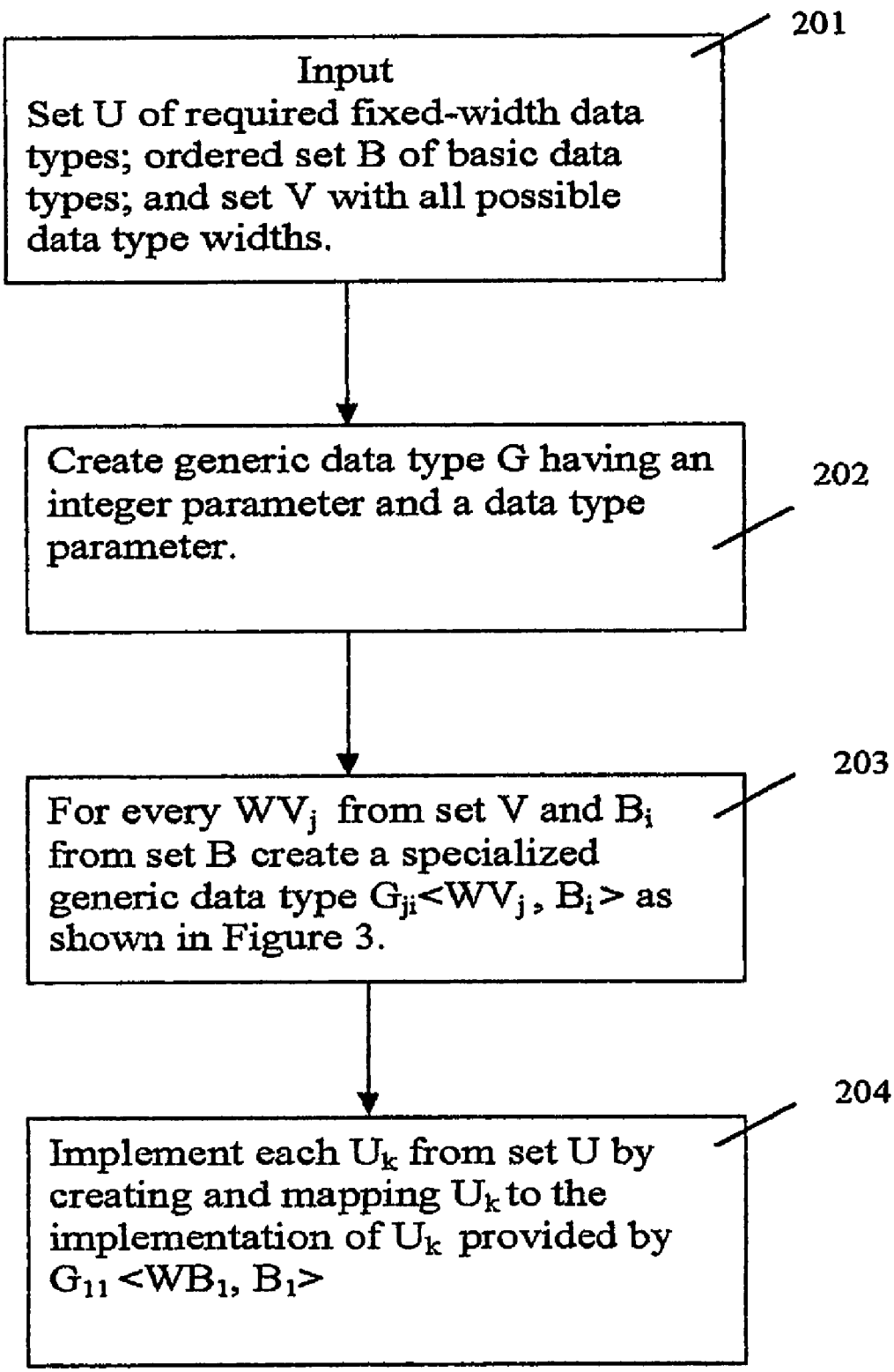
FIGS. 2 and 3 are flow charts of the method according to a particular embodiment of the invention.

FIG. 2 is a flow chart showing the main method steps taken to achieve the object of the invention.

In step 201 a set U of required fixed-width data types, an ordered set B of basic data types and a set V with all possible data type widths are fed as inputs.

In step 202 a generic data type G having an integer parameter and a data type parameter is created.

In step 203, for every combination of data type width $WV_j$ from set V, and basic data type $B_i$ from set B a specialized generic data type G having an integer parameter $WV_j$ and data type parameter data type parameter $B_i$ is created.

In step 204 each required fixed-width data type $U_k$ is implemented by creating and mapping $U_k$ to the implementation provided by $G_{11}$ having integer type parameter $WB_1$ and data type parameter $B_1$.

Figure 3:
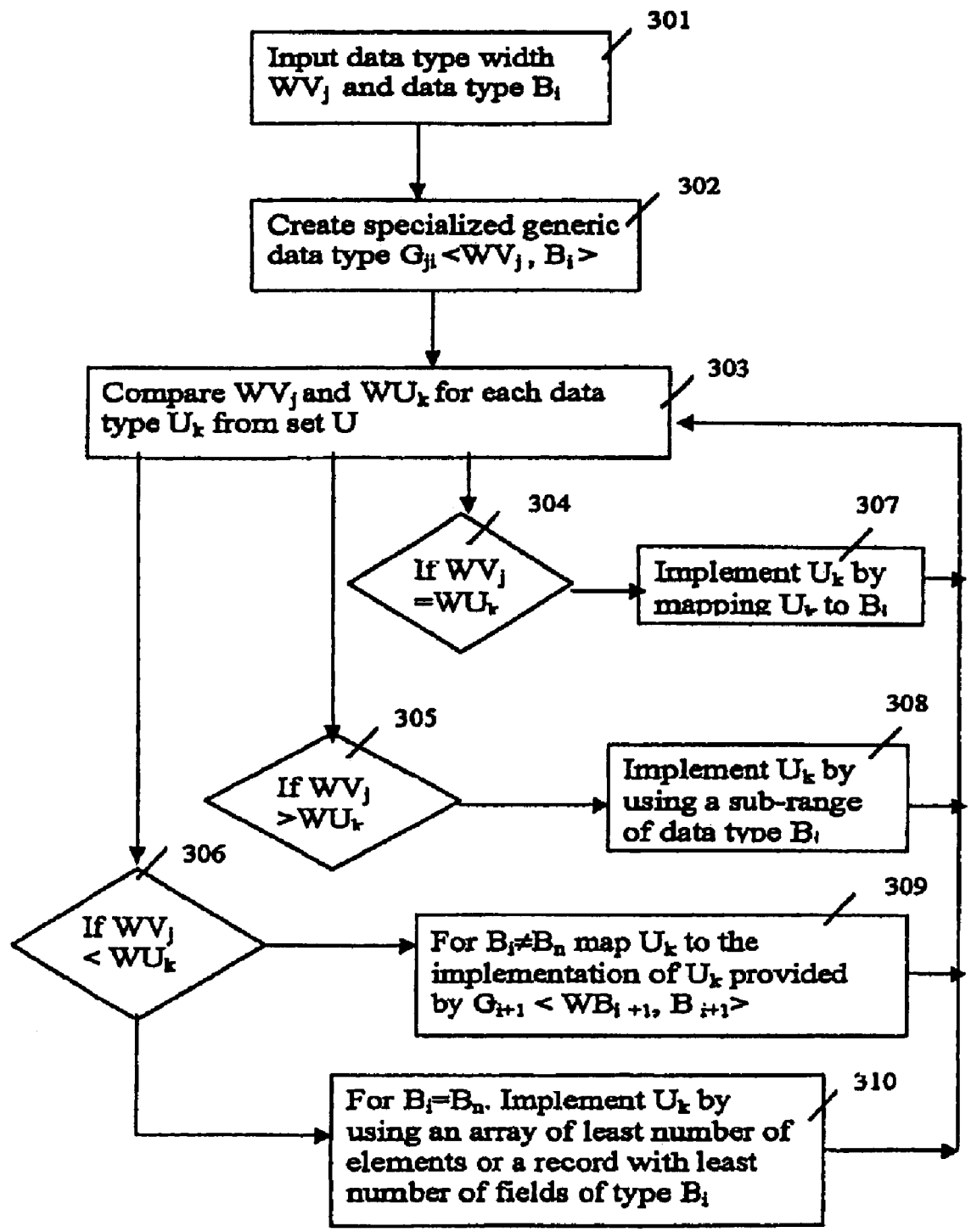

FIG. 3 shows the details of the step 203 shown in FIG. 2.

In step 301 data type width $WV_j$ from a set V having all possible data type widths and basic data type $B_i$ from an ordered set B of basic data types are provided as inputs.

In step 302 specialized generic data type $G_{ji}$ having an integer parameter $WV_j$ and data type parameter $B_i$ is created.

In step 303 data type width $WV_j$ is compared with the width $WU_k$ of every required fixed-width data type $U_k$ from the set U.

In steps 304 and 307 data type $U_k$ is implemented by mapping $U_k$ to $B_i$ if the data type width $WV_j$ is equal to data type width $WU_k$.

In steps 305 and 308 data type $U_k$ is implemented using a sub-range of basic data type $B_i$ if data type width $WV_j$ is greater than data type width $WU_k$.

In steps 306 and 309, if basic data type $B_i$ is not the last basic data type $B_n$ from set B, then data type $U_k$ is mapped to the implementation of $U_k$ provided by G having integer parameter $WB_{i+1}$ and data type parameter $B_{i+1}$.

In steps 306 and 310 required fixed-width data type $U_k$ is implemented by using an array of least number of elements of basic data type $B_i$ or least number of fields of basic data type $B_i$.

A typical example in which the method according to the invention is used with programming language C++ is given below.

Module Name: fixed_width_int.h

```
# include <limits.h>
// Inputs:
//
// Set B: char short long
//
//Set U: Char (Wchar = 8 bits) Short (Wshort = 16 bits)
      long (Wlong = 32 bits)
//
// Set V: 8, 16, 32
//
// Implements Fixed-Width Integer Data Types
//
// Char 8-bits
// Short 16-bits
// Long 32-bits
//
// Get value of CHAR_BIT from limits.h
// WB values
#define Wchar CHAR_BIT
#define Wshort (CHAR_BIT * sizeof (short))
# define Wlong (CHAR_BIT * sizeof (long))
// A template class declaration that implements
sub-ranges types.
// Definition/Implementation not included in this
sample.
//
// FP1 = width of basic type FP2
// FP3 = width of required integer type.
Template <int FP1, class FP2, int FP3 > struct
SUBRANGE;
//
// A template class declaration that implements
extensions using arrays.
// Definition/Implementation not included in this
```

-continued

```
sample.
//
// FP1 = Width of basic type FP2
// FP3 = Width of required integer type.
Template < int. FP1, class FP2, int FP3> struct
extension;
//
// template class declaration for a general
purpose fixed-width
// integer . (Implementation not part of this
sample).
//
template <int FP1, class FP2, int FP3>struct FWINT;
// A General Type, providing a possibly
inefficient implementation of U
template <int FP1, class FP2 >struct G {
                typedef FWINT<FP1, FP2, 8> Char;
        typedef FWINT<FP1, FP2 , 16> Short;
        typedef FWINT<FP1, FP2, 32> Long;
};
// SpecializedGeneric Type G for 32; long
template <> struct G<32, long> {
                    typedef SUBRANGE<32, long, 8>
Char;
        typedef SUBRANGE<32, long, 16> Short;
        typedef long Long;
};
// Specialized Generic Type G for 16, long
template <> Struct G<16, long> {
            typedef SUBRANGE<16, long, 8> Char;
        typedef short Short;
        typedef EXTENSION<16, long, 32> Long;
};
// Assuming long is *at least* 16 bits, there is
no need for G<8, long>
// Specialized Generic Type G for 32, short
template <> struct G<32, short> {
        typedef SUBRANGE<32, short, 8 >Char;
            typedef SUBRANGE<32, short, 16> Short;
        typedef short Long;
};
// Specialized Generic Type G for 16, short
template <> struct G<16, short> {
        typedef SUBRANGE<16, short, 8 >Char;
            typedef short Short;
        typedef G<Wlong, long>: : Long Long;
};
// Specialized Generic Type G for 8, short
template <> struct G<8, short> {
        typedef short Char;
            typedef G<Wlong, long>: :Short Short;
            typedef G<Wlong, long>: : Long Long;
};
// Specialized Generic Type G for 32, char
template <> struct G<32, char> {
        typedef SUBRANGE<32, char, 8 >Char;
        typedef SUBRANGE<32, char, 16 > Short;
            typedef char Long;
    };
// Specialized Generic Type G for 16, char
template <> struct G<16, char > {
                typedef SUBRANGE<16, char, 8 >Char;
            typedef char Short;
            typedef G<Wshort, short>: : Long
Long;
};
// Specialized Generic Type G for 8, char
template <> struct G<8, char> {
    typedef char Char;
            typedef G<Wshort, short>: :Short Short;
            typedef G<Wshort, short>: : Long Long;
};
//
// Final Step: Create and map U1 (Char), U2
(Short), U3 (Long) // and map them to the
implementation of corresponding type
// provided by G<wchar, char>
//
typedef G<Wchar, char>: :Char Char;
```

-continued

```
        typedef G<Wchar, char>: :Short Short;
        typedef G<Wchar, char>: :Long Long;
```

I claim:

1. A method of implementing in a portable manner, fixed-width data types where such fixed-width data types are not directly supported by a programming language, said method comprising the steps of: a) providing as inputs (i) a set U of required fixed-width data types that have to be implemented in which each fixed-width data type $U_k$ from the set U has a fixed-data type width of $WU_k$; (ii) an ordered set B of basic data types that are directly supported by the said programming language, in which each basic data type $B_i$ from the set B has a data type width $WB_i$ and each data type width $WB_{i+1}$ is greater than or equal to data type width $WB_i$; and (iii) a set V having all possible data type widths $WV_j$ for every basic data type $B_i$ from the set B of basic data types; b) creating a generic data type G with two formal parameters consisting of an integer parameter and a data type parameter; c) for every combination of data type width $WV_j$ from the set V, and basic data type $B_i$ from the set B creating a specialized generic data type $G_{ji}$ having an integer parameter $WV_j$ and a data type parameter $B_i$ and providing a possible implementation within the specialized generic data types $G_{ji}$ for each required fixed-width data type $U_k$ from the set U by comparing the data type width $WV_j$ with data type width $WU_k$ for every required fixed width data types $U_k$ from the set U; d)(i) if data type width $WV_j$ is equal to the data type width $WU_k$, implementing the required fixed-width data type $U_k$ by creating and mapping data type $U_k$ to data type $B_i$; (ii) if data type width $WV_j$ is greater than the data type width $WU_k$, implementing the required fixed-width data type $U_k$ by using a sub-range of basic data type $B_i$; (iii) if data type width $WV_j$ is lesser than the data type width $WU_k$ and if $B_i$ is not the last basic data type form the set B, implementing the required fixed-width data type $U_k$ by mapping $U_k$ to the implementation of $U_k$ provided by the specialized generic data type G having the integer parameter $WB_{i+1}$ and the data type parameter $B_{i+1}$; and (iv) if data type width $WV_j$ is lesser than the data type width $WU_k$ and if $B_i$ is the last basic data type from set B, implementing the required fixed-width data type $U_k$ by using an array with the least required number of elements of basic data type $B_i$ or a record with least required number of fields of basic data type $B_i$; and e) finally implementing the set U of required fixed-width data types $U_k$ by selecting from the above possible implementations a correct implementation for each required fixed data type $U_k$ of the set U of required fixed-width data types, by creating and mapping the required fixed-width data type $U_k$ to the implementation of $U_k$ provided by the specialized generic data type G having the integer parameter $WB_i$ and the data type parameter $B_1$ wherein i, j, k and n are all positive integers.

2. A method of implementing in a portable manner, fixed-width data types where such fixed-width data types are not directly supported by a programming language, said method comprising the steps of: a) providing as inputs (i) a set U of required fixed-width data types that have to be implemented in which each fixed-width data type $U_k$ from the set U has a fixed data type width of $WU_k$; (ii)

an ordered set B of basic data types that are directly supported by the said programming language, in which each basic data type $B_i$ from the set B has a data type width $WB_i$ and each data type width $WB_{i+1}$ is greater than or equal to data type width $WB_i$; and (iii) a set V having all possible data type widths $WV_j$ for every basic data type $B_i$ from the set B of basic data types; b) creating a generic data type G with two formal parameters consisting of an integer parameter and a data type parameter; c) for every combination of data type width $WV_j$ from the set V, and basic data type $B_i$ from the set B creating a specialized generic data type $G_{ji}$ having an integer parameter $WV_j$ and a data type parameter $B_i$ and providing a possible implementation within the specialized generic data types $G_{ji}$ for each required fixed-width data type $U_k$ from the set U by comparing the data type width $WV_j$, with data type width $WU_k$ for every required fixed-width data types $U_k$ from the set U; d)(i) if data type width $WV_j$ is equal to the data type width $WU_k$, implementing the required fixed-width data type $U_k$ by creating and mapping data type $U_k$ to data type $B_i$; (ii) if data type width $WV_j$ is greater than the data type width $WU_k$, and if $B_i$ is not the first basic data type from the set B, implementing the required fixed-width data type $U_k$ by creating and mapping the required fixed-width data type $U_k$ to the implementation of $U_k$ provided by the specialised generic data type G having the integer parameter $WB_{i-1}$ and the data type parameter $B_{i-1}$; (iii) if data type width $WV_j$ is greater than the data type width $WU_k$ and if $B_i$ is the first basic data type form the set B, implementing the required fixed width data type $U_k$ by using a sub-range of basic data type $B_i$; and (iv) if data type width $WV_j$ is lesser than the data type width $WU_k$, implementing the required fixed-width data type $U_k$ by using an array, with the least required number of elements of basic data type $B_i$ or a record, with least required number of fields of basic data type $B_i$; and finally implementing the set U of required fixed-width data types $U_k$ by selecting from the above possible implementations a correct implementation for each required fixed-width data type $U_k$ from the set U of required fixed-width data types, by creating and mapping the required fixed-width data type $U_k$ to the implementation of $U_k$ provided by the specialized generic data type G having integer parameter $WB_n$ and the data type parameter $B_n$, where $B_n$ being the last basic data type from the set B of basic data types; wherein i, j, k and n are all positive integers.

* * * * *